United States Patent
Cavataio et al.

(10) Patent No.: US 8,343,448 B2
(45) Date of Patent: Jan. 1, 2013

(54) SYSTEM FOR REDUCING NOX IN EXHAUST

(75) Inventors: Giovanni Cavataio, Dearborn, MI (US); James W. Girard, Belleville, MI (US); Hungwen Jen, Troy, MI (US); Rachel Alison Snow, Belleville, MI (US); Christine Kay Lambert, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 399 days.

(21) Appl. No.: 12/242,437

(22) Filed: Sep. 30, 2008

(65) Prior Publication Data
US 2010/0077738 A1   Apr. 1, 2010

(51) Int. Cl.
*B01D 53/56* (2006.01)
(52) U.S. Cl. .............. 423/212; 423/213.5; 423/239.2; 422/111
(58) Field of Classification Search .............. 422/111, 422/172, 177, 180; 502/67, 527.12; 423/212, 423/213.5, 239.2
See application file for complete search history.

(56) References Cited

U.S. PATENT DOCUMENTS

| | | | |
|---|---|---|---|
| 5,024,981 A * | 6/1991 | Speronello et al. | 502/67 |
| 5,427,989 A | 6/1995 | Kanesaka et al. | |
| 5,744,103 A * | 4/1998 | Yamada et al. | 422/171 |
| 5,983,628 A | 11/1999 | Borroni-Bird et al. | |
| 6,133,185 A * | 10/2000 | Kinugasa et al. | 502/67 |
| 6,147,023 A * | 11/2000 | Hirayama et al. | 502/64 |
| 6,488,904 B1 | 12/2002 | Cox et al. | |
| 6,845,612 B2 | 1/2005 | Jobson et al. | |
| 6,846,464 B2 * | 1/2005 | Montreuil et al. | 422/177 |
| 6,887,815 B2 * | 5/2005 | Tissler et al. | 502/67 |
| 6,928,359 B2 * | 8/2005 | Xu et al. | 701/102 |
| 7,033,969 B1 * | 4/2006 | Jobson et al. | 502/66 |
| 7,063,818 B2 * | 6/2006 | Endo et al. | 422/177 |
| 7,562,522 B2 * | 7/2009 | Yan | 60/286 |
| 2004/0200757 A9 | 10/2004 | Takewaki et al. | |
| 2006/0188416 A1 | 8/2006 | Alward et al. | |

* cited by examiner

*Primary Examiner* — Jill Warden
*Assistant Examiner* — Joye L Woodard
(74) *Attorney, Agent, or Firm* — Julia Voutyras; Alleman Hall McCoy Russell & Tuttle LLP

(57) ABSTRACT

Systems and methods are provided for reducing NOx emissions from a vehicle including an engine having an exhaust. In one example, the system comprises a NOx reducing system coupled to the engine exhaust including a base metal zeolite, said NOx reducing system including a first layer with a first pore size and a second layer with a second pore size, said first pore size being smaller than said second pore size.

4 Claims, 7 Drawing Sheets

SYSTEM FOR REDUCING NOX IN EXHAUST

FIELD

The present description relates generally to an exhaust treatment system for a combustion engine.

BACKGROUND/SUMMARY

Nitrogen oxides, such as NO and $NO_2$ (collectively referred to as NOx), generated in the high temperature and high pressure conditions of an internal combustion engine, may constitute a large percentage of total exhaust emissions. In particular, NOx species emitted in the exhaust of lean-burn engines may be particularly difficult to eliminate. Accordingly, engine exhaust systems may utilize selective catalytic reduction (SCR) to reduce the NOx species to diatomic nitrogen and water. A variety of SCR catalysts have been developed including base metal catalysts and zeolite-based catalysts. These catalysts reduce NOx species in the presence of a reducing agent, such as ammonia or urea.

However, the inventors herein have recognized several issues with such catalysts. As one example, during cold start operations and/or at temperatures below catalyst light-off, SCR catalysts may be exposed to a large amount of hydrocarbons (HCs). At these low operating temperatures, zeolite-based SCR catalysts in particular, may adsorb and store a large fraction of the emitted HCs. The stored HCs may degrade the SCR reaction and consequently reduce the NOx conversion efficiency of the catalyst. Furthermore, if not removed from the catalyst, engine operating conditions can trigger an unexpected oxidation of the stored HCs, causing a significant increase in temperature, and possibly permanent thermal deactivation of the SCR catalyst.

In one example, some of the above issues may be addressed by a system for a vehicle including an engine having an exhaust, the system comprising a NOx reducing system coupled to the engine exhaust including a base metal zeolite, said NOx reducing system including a first layer with a first pore size and a second layer with a second pore size, said first pore size being smaller than said second pore size.

As one example, a zeolite formulation configured with a small pore size (e.g., at or less than about 5 Angstroms) may be included as the first layer with the first (smaller) pore size in an engine NOx reducing system. As such, the smaller pore zeolite formulation may or may not include any metals. A base metal zeolite configured with a larger pore size may be included as the second layer with the second (larger) pore size in the engine NOx reducing system. The base metal zeolite may be a transition metal-based zeolite catalyst. As one example, the base metal zeolite may be an Fe-based zeolite catalyst. Alternatively, a Cu-based zeolite catalyst may be employed. The first layer may be positioned between a passage for exhaust gas and the second layer. In this way, the first layer may also constitute an outer layer that may be exposed to exhaust gas before the second layer. The second layer may be positioned between the first layer and a substrate support. In this way, the second layer may also constitute an inner layer that may be exposed to untreated exhaust gas after the first layer. The small pore size of the first layer may impart molecular sieve properties to the layer, thereby buffering and protecting the SCR catalyst in the larger pore sized second layer from large molecular weight hydrocarbons. By reducing the amount of HCs adsorbed, associated exotherms may also be averted. Thus, the use of a first and a second layer of differing pore sizes in an engine NOx reducing system may enable efficient reduction of NOx species by SCR catalysts without the catalysts being adversely affected by exhaust emission HCs. Additionally, in still another embodiment, the first layer may be positioned upstream of the second layer.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
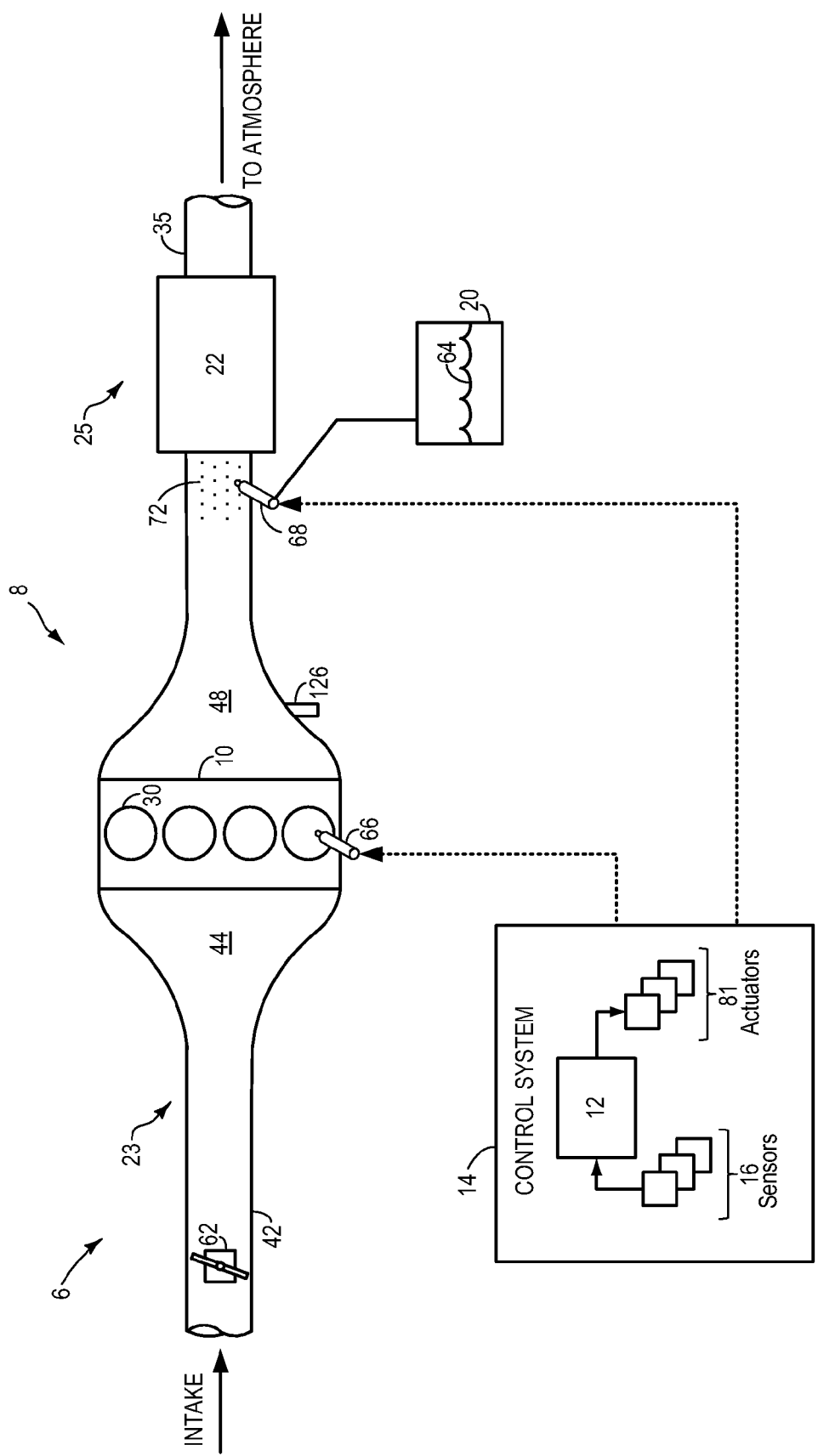
FIG. 1 is a schematic depiction of an engine and an associated NOx reducing system.
Figure 2:
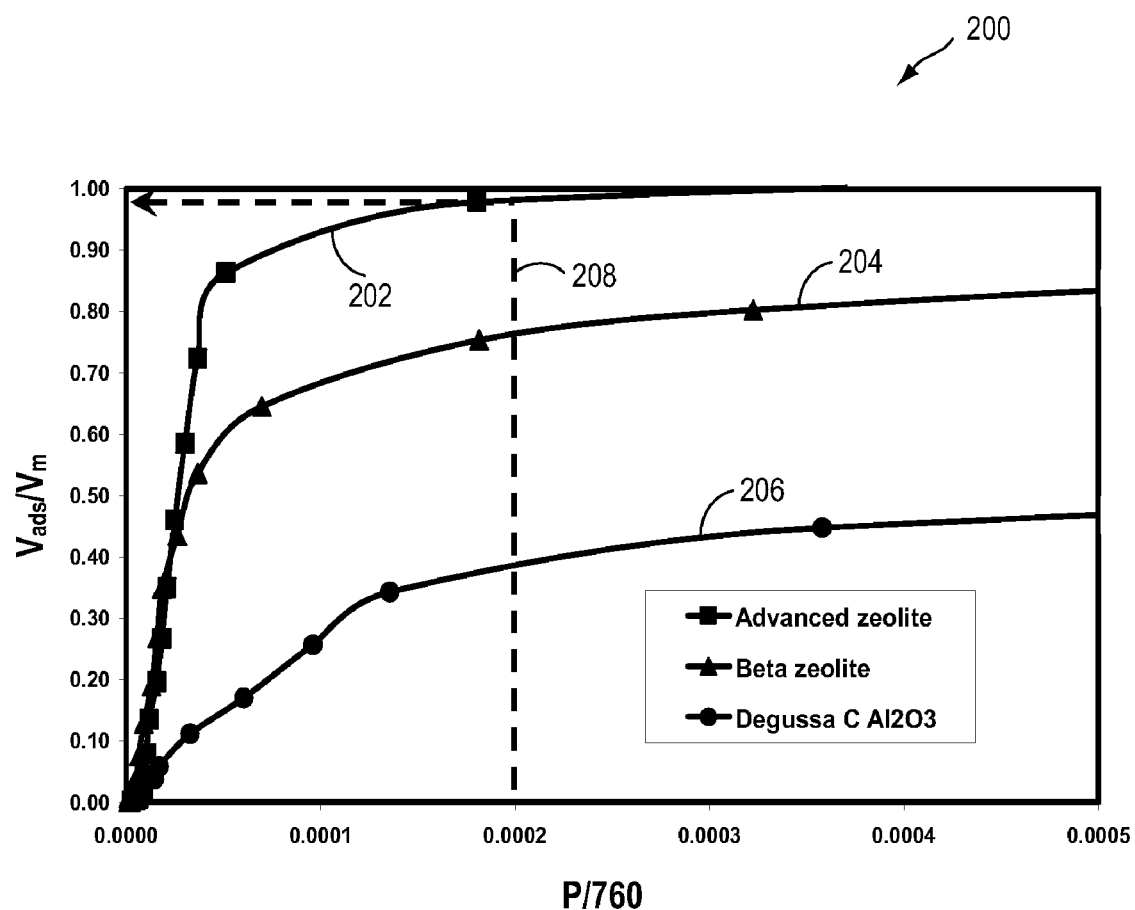
FIG. 2 shows a graphical comparison of the nitrogen adsorption ability of the smaller pore zeolite of the present disclosure with that of other micro-porous materials.
Figure 3A:
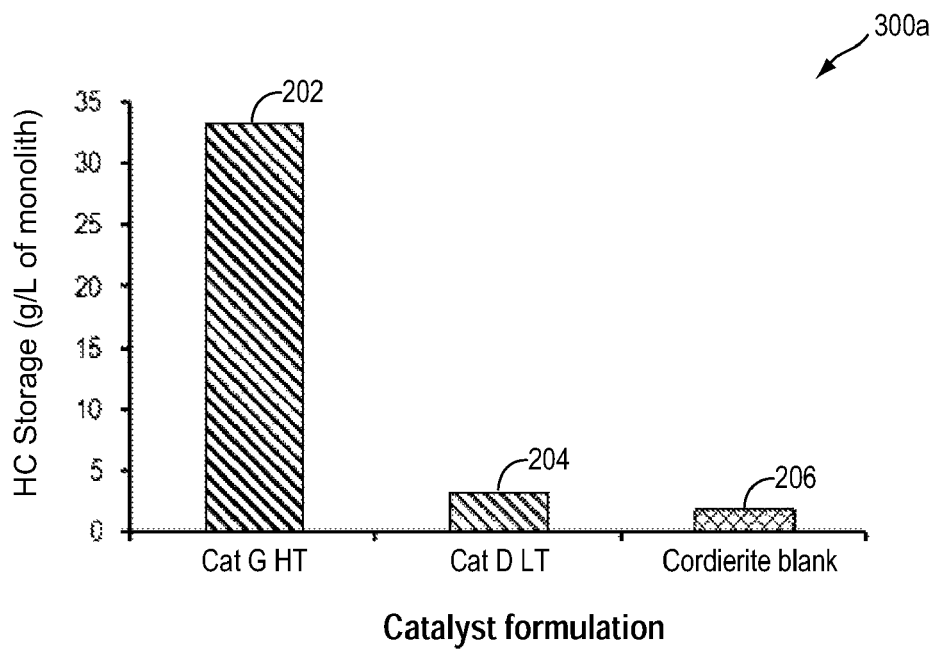
FIG. 3A shows a graphical comparison of NOx conversion performances of different base metal zeolite catalysts derived from the smaller pore zeolite of FIG. 2.
Figure 3B:
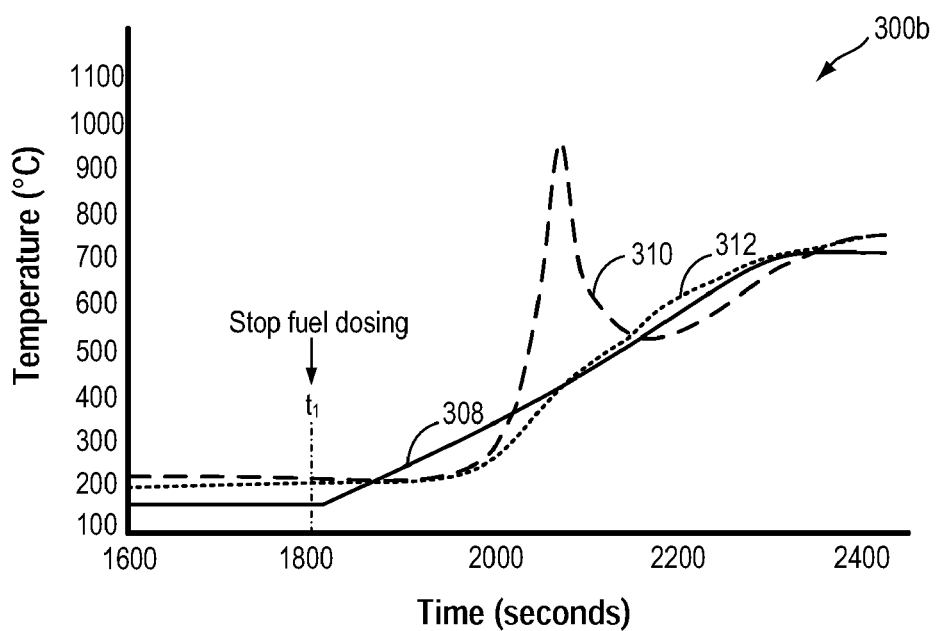
FIG. 3B shows a graphical comparison of exotherms generated by the different base metal zeolite catalysts of FIG. 3A.

The following description relates to systems and methods for reducing hydrocarbon adsorption and improving NOx reduction in a NOx reducing system coupled to an engine exhaust including a base metal zeolite, as shown in FIG. 1. In one example, the NOx reducing system may include a first layer with a first pore size and a second layer with a second pore size. The layers may be configured with the first pore size being smaller than the second pore size. The smaller pore sized first layer may thus act as a molecular sieve in one example, filtering out large molecular weight HCs during lean-burn and/or low temperature conditions. The first layer may also protect SCR catalysts included in the second layer from the detrimental thermal effects of HC adsorption. The first layer may include a smaller pore zeolite formulation configured with a small and substantially uniform pore size, as characterized in FIG. 2, such that the amount of HC adsorbed is significantly reduced. As shown in FIGS. 3A-B, the smaller pore zeolite may allow for the development of highly active copper (Cu)-based zeolite catalysts. However, the same formulation may also be used for other base metal zeolite formulations, such as for example iron (Fe)-based formulations. Use of the smaller pore zeolite in the first layer may reduce unexpected catalyst temperature rises in the second layer during engine operating conditions. The first and second layers may be arranged in various configurations, some examples of which are provided with reference to FIGS. 4-8. By reducing the amount of HCs adsorbed by a base metal zeolite catalyst incorporated in the second layer, associated issues such as catalyst degradation and unexpected thermal deactivation may be avoided, thereby enhancing the overall NOx reducing ability of the catalyst over a range of operating temperatures.

FIG. 1 shows a schematic depiction of a vehicle system 6. The vehicle system 6 includes an engine system 8 coupled to a NOx reducing system 22. The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere. The engine exhaust 25 may include one or more emission control devices, which may be mounted in a close-coupled position in the exhaust. The one or more emission control devices may include NOx reducing system 22. Additional emission control devices (not shown) may include a three-way catalyst, a diesel particulate filter, oxidation catalyst, etc. It will be appreciated that other components may be included in the engine such as a variety of valves and sensors.

NOx reducing system 22 may include a first layer with a first pore size and a second layer with a second pore size. Specifically, the first pore size of the first layer may be smaller than the second pore size of the second layer. The first pore size may be configured to be small enough to block HCs from entering the catalyst, but allow smaller molecules such as NO, $NO_2$ and $NH_3$ to pass through. As one example, the pore size may be 5 angstroms or lower. At least the second layer may be configured to include SCR catalysts, such as base metal zeolite catalysts. In one example, the first layer may include a smaller pore zeolite while the second layer may include a base metal zeolite for performing a selective catalytic reduction (SCR) of the NOx species in the exhaust entering the NOx reducing system. Herein the first zeolite layer may have a plurality of pores, with an average pore size of 5 Angstroms or less while the second zeolite layer (with the base metal zeolite) may also have a plurality of pores, but with an average pore size of more than 5 Angstroms. The first and second layers may be layered on and be supported by a substrate support. Alternatively, the first and second layers may be incorporated within the substrate support. The incorporated SCR catalyst may promote the reaction of a reducing agent 64, such as ammonia or urea, with the NOx species to form nitrogen and water selectively over the competing reaction of oxygen and the reducing agent. Further details regarding different example embodiments of NOx reducing system 22 with first and second layers of differing pore size are elaborated with reference to FIGS. 4-8.

A reducing agent delivery system, configured to deliver a reducing agent to the NOx reducing system, may be further included in the vehicle system. Reducing agent 64 may be added to the exhaust gas just before the exhaust enters NOx reducing system 22. The liquid reducing agent 64 may be injected into the exhaust by reducing agent injector 68, in an atomized or mist form 72, in response to a signal from an engine control system. The reducing agent may be stored in reducing agent tank 20. A valve (not shown) and/or a pump (not shown) may be used to control flow and pressure of the reducing agent into injector 68. In one example, reducing agent 64 may be anhydrous or aqueous ammonia. In another example, reducing agent 64 may be urea.

A fuel system (not shown) may be provided including one or more pumps for pressurizing fuel delivered to the injectors of engine 10, such as the example injector 66 shown. While only a single injector 66 is shown, additional injectors are provided for each cylinder. The fuel system may be a returnless fuel system, a return fuel system, or various other types of fuel system.

The vehicle system 6 may further include control system 14. Control system 14 is shown receiving information from a plurality of sensors 16 and sending control signals to a plurality of actuators 81. As one example, sensors 16 may include exhaust gas sensor 126 located upstream of the emission control device. Other sensors such as pressure, temperature, air/fuel ratio, and composition sensors may be coupled to various locations in the vehicle system 6. As another example, the actuators may include fuel injector 66, reducing agent injector 68, and throttle 62. The control system 14 may include a controller 12. The controller may receive input data from the various sensors, process the input data, and trigger the actuators in response to the processed input data based on instruction or code programmed therein corresponding to one or more routines.

The smaller pore zeolite of the present disclosure may be configured with a narrow and uniform pore size distribution. As one method of characterizing the micro-porous nature of the smaller pore zeolite, the nitrogen adsorption ability of the zeolite may be compared to other micro-pore containing materials. FIG. 2 depicts the results of such a comparison.

Herein, the smaller pore zeolite was compared to beta zeolite and Degussa C $Al_2O_3$. The adsorption of nitrogen at liquid nitrogen temperatures for the three materials was evaluated and compared using the BET equation. As such, a higher volume of adsorbed nitrogen (depicted as a ratio of the volume of nitrogen adsorbed, $V_{ads}$, to the monolayer volume of the material, $V_m$) as a function of the relative pressure, is indicative of a higher number of micro-pores per unit mass. FIG. 2 depicts graph 200 comparing an adsorption curve 202 for the smaller pore zeolite with an adsorption curve 204 for beta zeolite and an adsorption curve 206 for Degussa C $Al_2O_3$. The graph shows a ratio of $V_{ads}/V_m$ for each material along the y-axis at varying relative pressures (P/760) along the x-axis. Based on the substantially greater nitrogen adsorption ability of the smaller pore zeolite vis-à-vis the other materials, it may be concluded that the smaller pore zeolite has a substantially higher number of micro-pores per unit mass. As such, this may translate into the ability of the smaller-pore zeolite to behave as a molecular sieve and inhibit the entry of large HC molecules. Further, based on graph 200, a desirable specification for the smaller pore zeolite to encompass the molecular sieve properties, is to have an approximate 80% adsorbed nitrogen volume at 0.00005 relative pressure (P/760) and 99% adsorbed nitrogen volume at 0.0002 relative pressure (as shown by dotted line 208). This specification may translate into a desirable narrow and uniform pore size distribution of around 5 angstroms or lower.

A series of base metal zeolite catalysts were derived from the smaller pore zeolite of the present disclosure to determine the scope of using such base metal catalysts in various NOx reducing systems. Specifically, Cu-based and Fe-based catalysts derived from the smaller pore zeolite were developed. Catalyst D LT represents an example of such a Cu-based zeolite catalyst while catalyst G HT represents an example of such an Fe-based zeolite catalyst. It will be appreciated that the catalyst examples used in the analyses were exemplary in nature and were not intended as limitations thereof. All example catalyst formulations were coated on honeycomb 400/4 CPSI cordierite substrates.

Comparisons were undertaken to establish whether the catalysts could be potentially used in different NOx reducing system configurations. The prospects of each catalyst were determined based on a comparison of their diesel fuel vapor storage capacities (FIG. 3A) and a comparison of exotherms generated when the tested catalysts were saturated with diesel fuel vapor (FIG. 3B).

FIG. 3A shows map 300a comparing diesel fuel vapor storage capacities of the Fe-based and Cu-based smaller pore zeolite catalysts. HC storage in grams/liter of catalyst monolith is plotted along the y-axis. All tested catalysts were saturated with 3000 ppm C1 vaporized diesel fuel for 90 minutes at a temperature of 200° C. and a space velocity of 15,000 hr$^{-1}$. The samples were weighed hot before and after the diesel vapor exposure. The fuel vapor storage capacities were also compared to an uncoated 400/4 CPSI cordierite substrate (cordierite blank). As illustrated, relative to the 1.8 g/L storage of the uncoated cordierite blank (at 306), the diesel fuel storage capacity of the Fe-based catalyst was significantly higher at almost 33 g/L (at 304), while the storage capacity for the Cu-based catalyst was significantly lower at almost 3 g/L (at 302). During burn-off, the high diesel power capacity of the Fe-based catalyst may potentially create damaging thermal events within the catalyst bed, as further elaborated in FIG. 3B. In contrast, the fuel storage capacity of the Cu-based zeolite catalyst may be more suitable for use within a NOx reducing system.

FIG. 3B shows map 300b comparing exotherms generated by the different catalysts when saturated with diesel fuel vapor. Temperature is plotted along the y-axis and time (in seconds) is plotted on the x-axis. The map depicts the exotherms formed as the catalysts are exposed to flowing lean gas conditions while the temperature is ramped from 180° C. to 670° C. at 1° C./second. The fuel dosing may be stopped at $t_1$, as indicated. As the feed-gas temperature is increased (shown by solid curve 308), the catalyst bed temperature for each catalyst increases. For the Fe-based catalyst with the higher diesel fuel vapor storage capacity, a significant temperature increase may be seen, with a sudden temperature spike (around time 2000-2100 seconds), as depicted in exotherm 310 (dashed curve). In contrast, for the Cu-based catalyst with the lower diesel fuel vapor storage capacity, no substantial temperature spike could be observed. On the contrary, the exotherm 312 (dotted curve) for the Cu-based catalyst, substantially mirrored the feed-gas temperature curve 308.

Taken together, the data from maps 300a and 300b suggest that the smaller pore zeolite material may allow for the development of highly active Cu-based SCR catalyst formulations, but may not be as suitable for other base metals such as iron. As such, Fe-based zeolite catalysts may be desirable in NOx reducing systems due to their higher NOx conversion performance at higher operating temperatures (for example in the range of 300° C. to 700° C.). In contrast, Cu-based zeolite catalysts exhibit higher NOx conversion performance at lower operating temperatures (for example in the range of 150° C. to 400° C.). Thus, neither the Cu-based nor the Fe-based zeolite catalyst derived from the smaller pore zeolite formation may be desirable for use in treating diesel exhaust that contains large HC species.

Therefore, to enable the molecular sieve properties of the smaller pore zeolite to be used in conjunction with the high NOx conversion performance of Fe-based zeolite catalysts at high operating temperature ranges, alternate embodiments of a NOx reducing system may be developed, as further elaborated with reference to FIGS. 4-8. Specifically, the smaller pore zeolite may be included as a first layer with a first pore size in a NOx reducing system while a base metal zeolite (such as an Fe-based zeolite) may be included as a second layer with a second pore size. The pore size of the first layer may be configured to be small enough to enable small molecules such as NO, $NO_2$, $NH_3$ and $O_2$ to pass through the layer, but exclude larger HC molecules. By configuring the first layer outer to the second layer, the first layer may act as a molecular sieve protecting and buffering the second layer from the harmful effects of adsorbed HCs.

Now turning to FIGS. 4-8, alternate embodiments of a NOx reducing system including a first layer with a first pore size and a second layer with a second pore size are illustrated. In the depicted embodiments, the smaller pore zeolite may be incorporated in the first layer of the NOx reducing system so that the smaller pore size of the first layer may be advantageously used as a HC barrier. A base metal zeolite catalyst (for example, an Fe-based zeolite catalyst) with a larger pore size may be incorporated in the second layer of the NOx reducing system. In one example, the first and second layers may be supported by a substrate support. The first layer may be positioned between a passage for exhaust gas and the second layer, while the second layer may be positioned between the substrate support and the first layer. In another example, the first layer may be layered on top of the second layer, however both layers may be incorporated substantially within the substrate support. In this way, the first layer may be configured as a protective HC tolerant outer layer inhibiting the adsorption of large HC molecules and protecting an inner layer from detrimental effects thereof.

Figure 4:
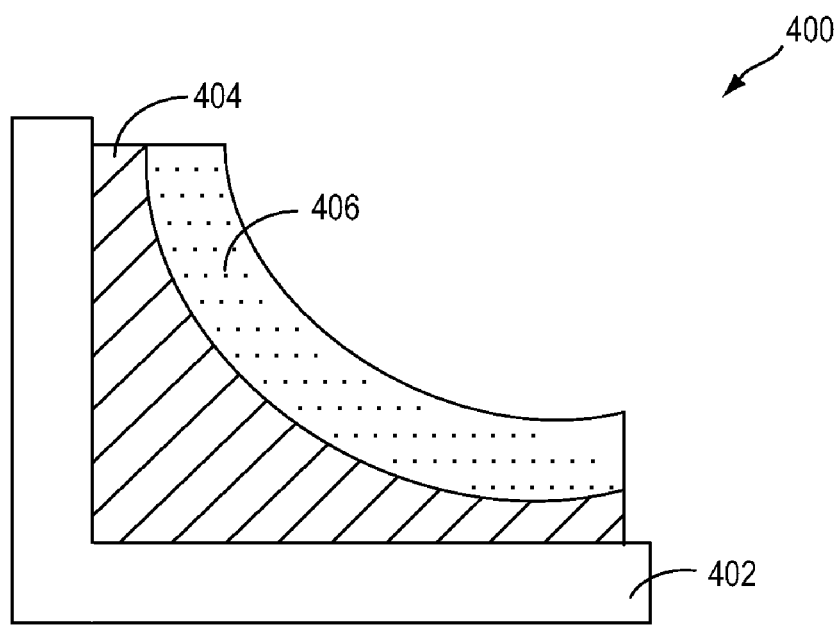
FIGS. 4-8 show different embodiments of the NOx reducing system of FIG. 1.

FIG. 4 shows a cross-sectional diagram of a first embodiment 400 of a NOx reducing system including a first layer with a first pore size and a second layer with a second pore size. The first layer may include the smaller pore zeolite. The second layer may include a base metal zeolite catalyst of larger pore size. The second layer may be coated on substrate support 402 to thereby form an inner layer 404. The first layer with the HC barrier properties may be coated on the second layer, that is inner layer 404, to form an outer layer 406. Thus, exhaust gas may be exposed to the first layer before being exposed to the catalyst of the second layer. Substrate support 402 may be of any suitable material such as metallic foils, cordierite, or silicon carbide. Inner layer 404 may include a coating of a base metal zeolite catalyst of any suitable material that yields a desired SCR performance and durability. As one example, the base metal zeolite catalyst used in inner layer 404 may be an Fe-based zeolite catalyst. As such, Fe-based zeolite catalysts may be activated at higher temperatures and thus may work optimally in higher operating temperature ranges. As another example, inner layer 404 may be coated with a Cu-based zeolite catalyst. As such, Cu-based zeolite catalysts may be activated at lower temperatures and inactivated at higher temperatures, and thus may work optimally in lower operating temperature ranges. Thus, in embodiment 400, the first layer (or outer layer 406) includes a zeolite with pores at or less than about 5 Angstroms or less while the second layer (or inner layer 404) includes the base metal zeolite with pores more than 5 Angstroms. By acting as a molecular sieve, outer layer 406 may prevent large molecular weight HC species from entering, adsorbing, and/or poisoning the desired SCR reaction of the catalyst included in inner layer 404.

Figure 5:
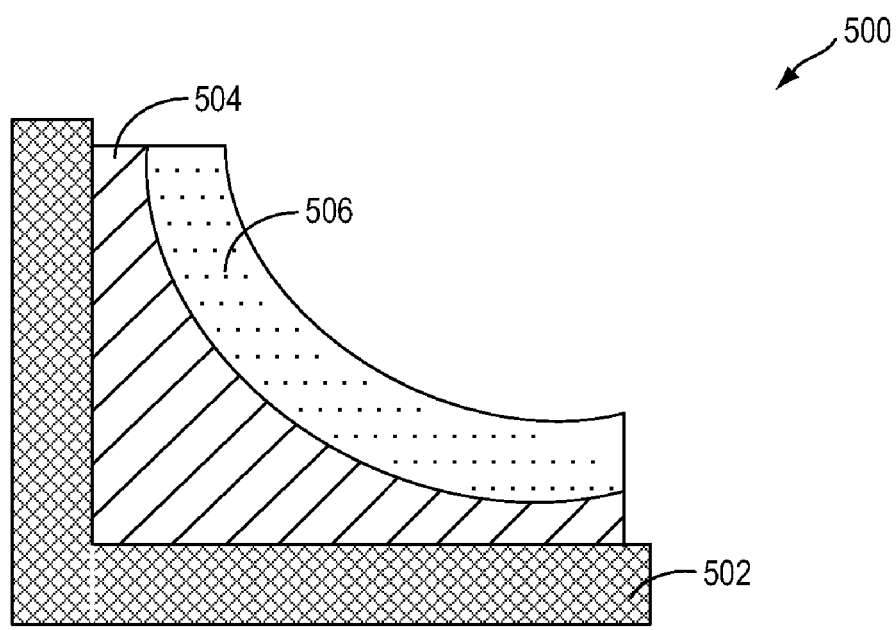

FIG. 5 shows a cross-sectional diagram of another embodiment 500 of a NOx reducing system including a first layer with a first pore size and a second layer with a second pore size. The embodiment 500 further comprises a substrate support 502 including at least one base metal zeolite within the support. Specifically, embodiment 500 has a substrate support 502 that is first coated with a base metal zeolite catalyst to form an inner layer 504, and then coated with the microporous advanced zeolite to form an outer layer 506. However, substrate support 502 herein may be of a high porosity variety, such as high porosity metallic foils, cordierite, or silicon carbide. The high porosity substrate support may have a porosity of 30 to 95%. Use of such a high porosity substrate support may enable an additional active base metal zeolite catalyst to be incorporated within the substrate support. As one example, outer layer 506 may be coated with the smaller pore zeolite, inner layer 504 may be coated with an Fe-based zeolite catalyst designed to work optimally at higher temperatures, and high porosity substrate support layer 502 may include a Cu-based zeolite catalyst designed to work optimally at low temperatures. In this example, use of base metal zeolite catalysts of differing optimal operating temperature ranges allows the temperature range of the NOx reducing system to be broadened, while use of the advanced HC tolerant zeolite protects the catalysts from the deleterious effects of HC storage. In another example, the Fe-based catalyst may be included in both the inner layer 504 and the high porosity substrate support 502. It will be appreciated that the high porosity substrate support 502 may be extruded. Further, the extruded support may be catalytically active or non-active for the desired SCR chemical reaction.

Figure 6:
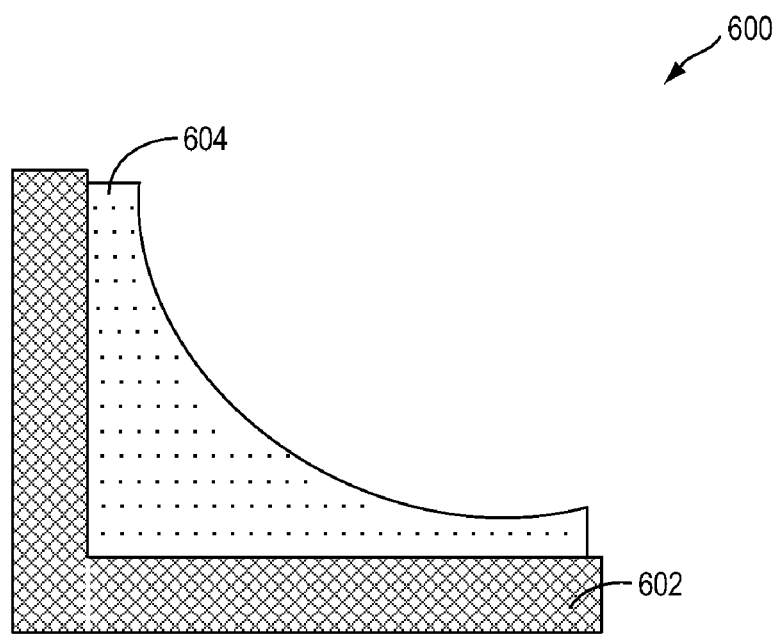

FIG. 6 shows a cross-sectional diagram of still another embodiment 600 of a NOx reducing system including a first layer with a first pore size and a second layer with a second pore size. Herein, the smaller pore zeolite may comprise the first layer with the first smaller pore size while the substrate support may comprise the second layer with the second larger pore size. High porosity substrate support 602 may be directly coated with the smaller pore zeolite to form outer layer 604. Thus, embodiment 600 may not include the additional inner layer of base metal zeolite, as shown in embodiments 400-500. Instead, the entire base metal zeolite may be placed within the high porosity substrate support 602. The support wall may be an extrusion of the base metal zeolite. The base metal zeolite catalyst may include Fe-based zeolite catalysts, Cu-based zeolite catalysts, or other metal-based zeolite catalysts.

Figure 7:
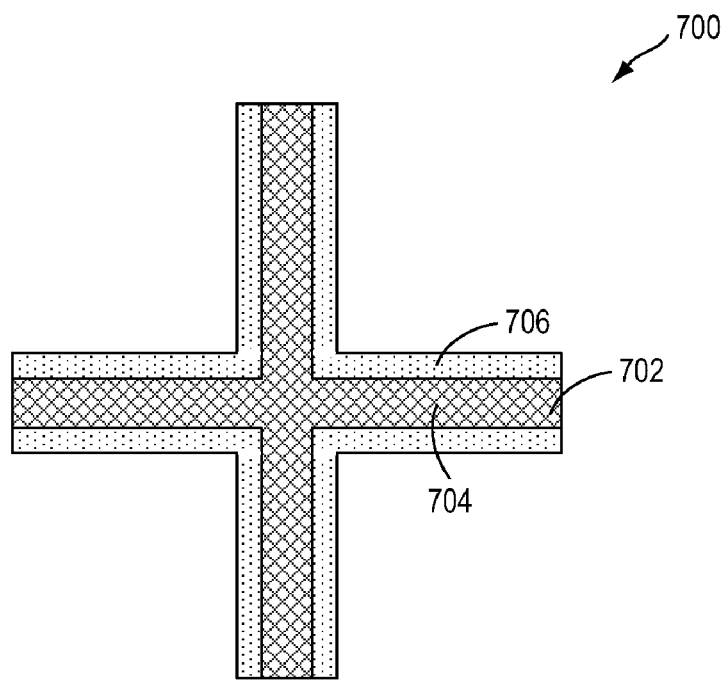

FIG. 7 depicts yet another embodiment 700 of a NOx reducing system including a first layer with a first pore size and a second layer with a second pore size. Herein, the first and second layers may be configured within the high porosity substrate such that the first layer is coated on an outer edge of the substrate support while the second layer is coated in the center of the substrate support. Thus, a base metal zeolite (such as an Fe-based zeolite catalyst) may be coated in the center of the high porosity substrate support 702 to form an inner substrate layer 704. The smaller pore zeolite may be coated next on top of the inner substrate layer 704 and on the outer edges of the substrate support 702 to form an outer substrate layer 706. As such, the smaller pore zeolite may be configured to sandwich the base metal zeolite catalyst within the substrate wall.

Figure 8:
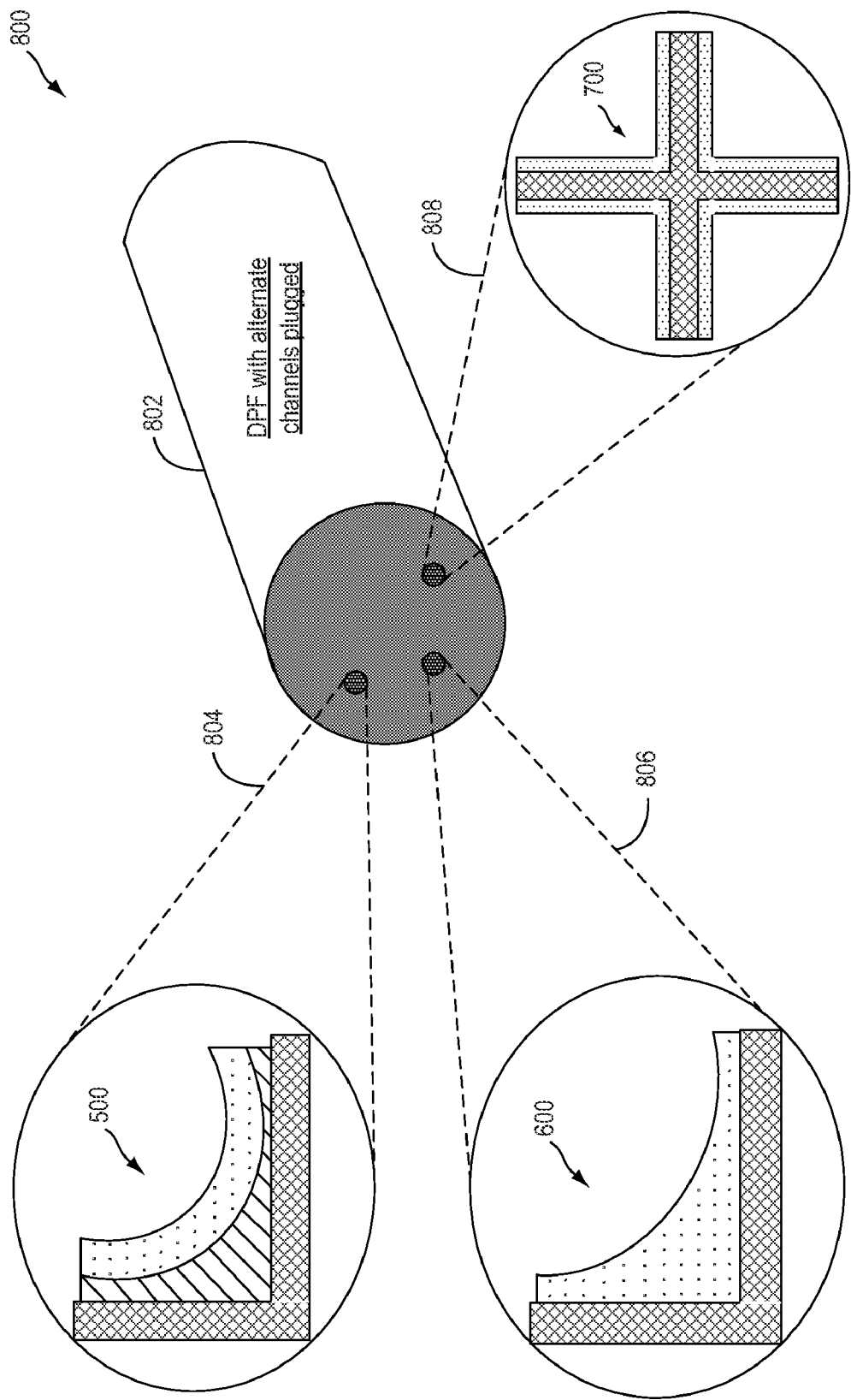

FIG. 8 depicts yet another embodiment 800 of a NOx reducing system including a first layer with a first pore size and a second layer with a second pore size. Specifically, embodiment 800 encompasses the multiple configurations described with reference to FIGS. 5-7 in a diesel particulate filter (DPF). Herein, the substrate support comprises a DPF. The DPF substrate support may include a plurality of channels with alternating ends blocked. As such various suitable particulate filters may be used. The DPF substrate 802 of the depicted embodiment may be of suitable high porosity in the range of about 30 to 95%, as in the high porosity substrate support of the previous embodiments. The high porosity DPF substrate 802 may then be coated with a base metal zeolite catalyst (such as an Fe-based zeolite catalyst) and the smaller pore zeolite formulation. Additionally, the DPF substrate 802 may have alternate channels plugged for trapping particulate matter. The configurations 500, 600, and 700, as previously outlined in FIGS. 5-7 respectively, may be incorporated into the DPF substrate 802 at 804, 806 and 808. In this way, a DPF configuration may be enabled wherein particulate matter trapping, particulate matter burn-off and NOx reduction may occur simultaneously.

It will be appreciated that the first layer in embodiments 400-800 may be configured to store extra reducing agent, for example extra ammonia, or extra urea, in addition to performing molecular sieve functions. By storing extra ammonia in the layer, the overall NOx conversion performance of the NOx reducing system may be further enhanced. A controller may be configured to perform a controlled reducing agent delivery operation to appropriately deliver the increased amount of reducing agent stored in the smaller pore first layer. In particular, the NOx conversion performance at lower temperatures, during warm-up conditions (for example, at 350° C.), may be augmented. The high ammonia to NOx ratio may enhance the reduction efficiency of the base metal catalyst incorporated in the second layer. As one example, when the base metal catalyst in the second layer is an Fe-based catalyst which otherwise has a reduced performance at lower temperatures, a higher ammonia to NOx ratio at the beginning of the NOx reduction process, enabled by the extra ammonia stored in the first layer, may boost the performance of the Fe-based catalyst at the lower temperatures. In another example, when the base metal catalyst in the second layer is a Cu-based catalyst which otherwise has good performance at lower temperatures, a higher ammonia to NOx ratio at the beginning of the NOx reduction process, enabled by the extra ammonia stored in the first layer, may further enhance the performance of the Cu-based catalyst at the lower temperatures.

Figure 9:
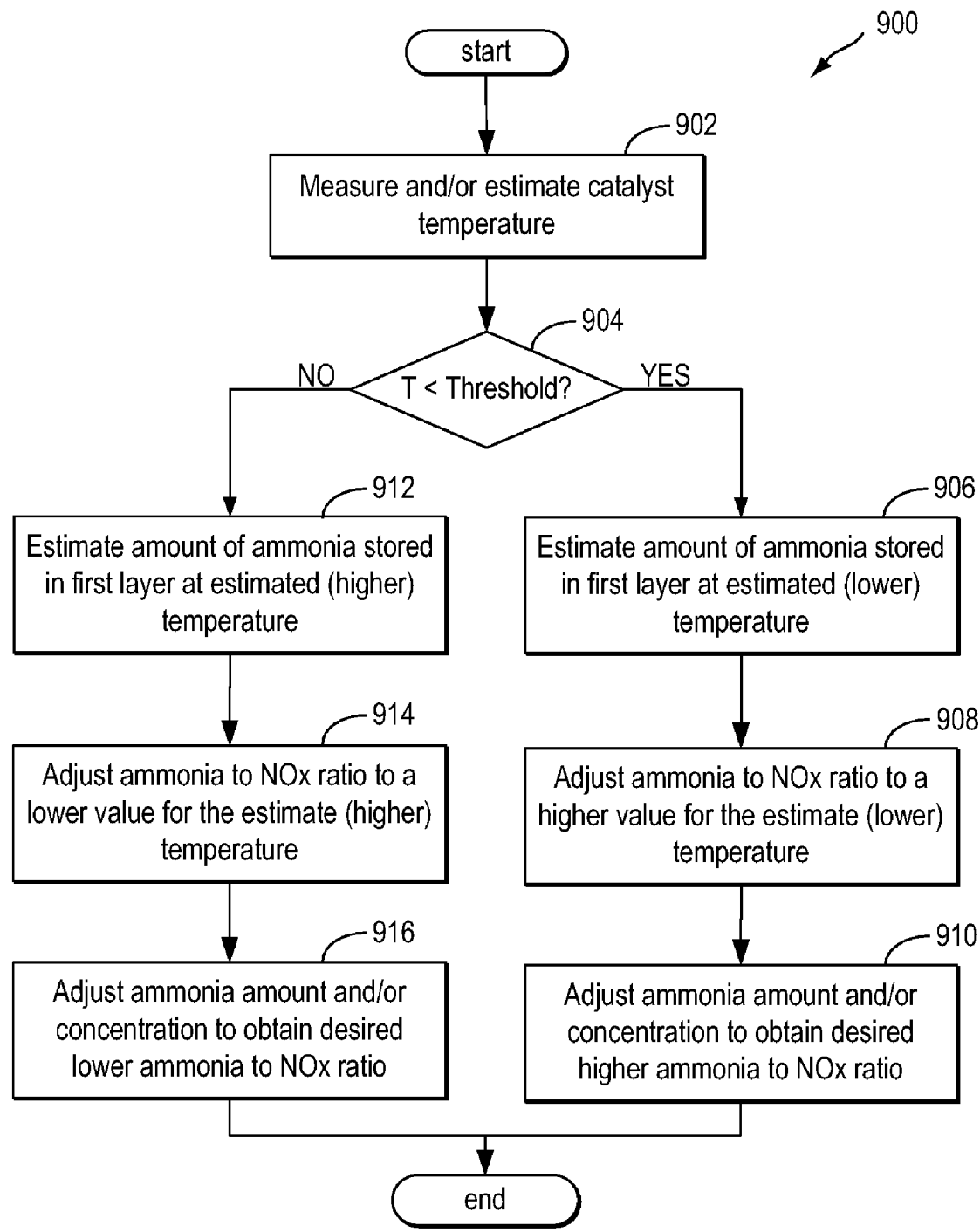
FIG. 9 depicts a high level flow chart for adjusting an amount of reducing agent added to the NOx reducing system responsive to the temperature of the system and an estimated amount of reducing agent stored in the smaller pored first layer.

An example of such a control operation is described with reference to FIG. 9 which depicts a routine 900 for adjusting an amount of reducing agent (herein ammonia) added to the NOx reducing system responsive to the temperature of the system and an estimate of an amount of ammonia stored in the smaller pore first layer.

At 902, a temperature of the NOx reducing system may be measured and/or estimated. At 904, it may be determined whether the temperature is below a predetermined threshold. In one example, the threshold may be a temperature above which a catalyst light-off may occur. Accordingly, if the temperature is below the predetermined threshold, then at 906, an amount of reducing agent (herein ammonia is used as an example) that may be stored in the small pored first layer at the estimated lower temperature range may be estimated. In one example, a look-up table may be used to predict an amount of ammonia that may be stored responsive to the temperature of the NOx reducing system. As such, at the lower temperature range, the first layer may be expected to store a higher amount of ammonia. Accordingly, at 908, the ammonia to NOx ratio may be adjusted to a higher value and at 910, the amount and/or concentration of ammonia injected may be adjusted to obtain the desired higher ammonia to NOx ratio.

In contrast, if at 904 it is determined that the temperature is above the predetermined threshold, then at 912, an amount of ammonia that may be stored in the small pored first layer at the estimated higher temperature range may be estimated. As such, at the higher temperature range, the first layer may be expected to store a lower amount of ammonia. Accordingly, at 914, the ammonia to NOx ratio may be adjusted to a lower value and at 916, the amount and/or concentration of ammonia injected may be adjusted to obtain the desired lower ammonia to NOx ratio.

In this way, the amount of reducing agent added to the NOx reducing system may be adjusted responsive to an estimate of the amount of reducing agent that may be stored in the small pored zeolite first layer. In doing so, the increased storage of reducing agent in the first layer, in particular at lower operating temperature ranges, may be advantageously used to adjust a reducing agent to NOx ratio for enhanced NOx conversion.

It will be appreciated that the configurations and process flows disclosed herein are exemplary in nature, and that these specific embodiments are not to be considered in a limiting sense, because numerous variations are possible.

The subject matter of the present disclosure includes all novel and non-obvious combinations and sub-combinations of the various systems and configurations, and other features, functions, and/or properties disclosed herein. The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a layered NOx reducing system coupled to an engine exhaust conducting exhaust gas, the method comprising:

passing engine exhaust gas through the NOx reducing system;

adding a reducing agent comprising ammonia to the exhaust gas just before the exhaust gas enters the NOx reducing system;

filtering exhaust hydrocarbons from the exhaust gas via a first reducing agent storing layer of the NOx reducing system, the first layer having a first pore size, the first layer layered on top of a second layer of the NOx reducing system, the stored reducing agent including the added ammonia; and reducing NOx species in the exhaust gas by selective catalytic reduction at least in the second layer, the second layer including an iron-exchanged zeolite catalyst and having a second pore size, said first pore size being smaller than said second pore size so as to allow ammonia stored in the first layer to pass through the second layer but exclude hydrocarbons from the second layer;

wherein an amount of reducing agent added to the NOx reducing system is adjusted responsive to a temperature of the NOx reducing system and an estimate of an amount of reducing agent stored in the first layer.

2. The method of claim 1 wherein passing engine exhaust gas through the NOx reducing system includes, passing exhaust gas through the second layer, the second layer coated on a substrate support of the NOx reducing system to form an inner layer; and passing exhaust gas through the first layer, the first layer coated on the second layer to form an outer layer, the first layer being exposed to the exhaust gas before the second layer.

3. The method of claim 2 wherein passing engine exhaust gas through the first layer includes passing engine exhaust gas through the first layer including a zeolite with pores at or less than about 5 Angstroms.

4. The method of claim 3 wherein passing engine exhaust gas through the NOx reducing system includes passing engine exhaust gas through the substrate support that comprises a diesel particulate filter, and wherein the amount of reducing agent added to the NOx reducing system is increased as the temperature of the NOx reducing system falls below a predetermined threshold.

* * * * *